Aug. 16, 1932.    I. F. BLIER    1,871,654
ROASTING APPARATUS
Filed June 19, 1930    2 Sheets-Sheet 1

ISAAK F. BLIER
INVENTOR
BY John P. Nikonow
ATTORNEY

Aug. 16, 1932.   I. F. BLIER   1,871,654

ROASTING APPARATUS

Filed June 19, 1930   2 Sheets-Sheet 2

ISAAK F. BLIER
INVENTOR

BY John P. Nixonow
ATTORNEY

Patented Aug. 16, 1932

1,871,654

UNITED STATES PATENT OFFICE

ISAAK F. BLIER, OF NEW YORK, N. Y.

ROASTING APPARATUS

Application filed June 19, 1930. Serial No. 462,293.

My invention relates to roasting devices and has a particular reference to devices for roasting small sausages commonly known as "frankfurters".

The object of my invention is to provide a convenient means for roasting frankfurters, preferably using an electric heater. Another object is to provide an apparatus of an attractive apperance which can be placed conveniently on a table or counter. For this purpose the device is made portable, of a sufficient size, however, to continuously roast several frankfurters. I also provide an easy and convenient arrangement for removing and replacing frankfurters.

An important feature of my device is that it is fully enclosed in a glass tube being thereby protected from dust. The frankfurters are not exposed to the outside air, so that the apparatus is clean and sanitary. Other novel and useful features of this invention will be apparent from the accompanying specification and drawings in which—

Figure 1:
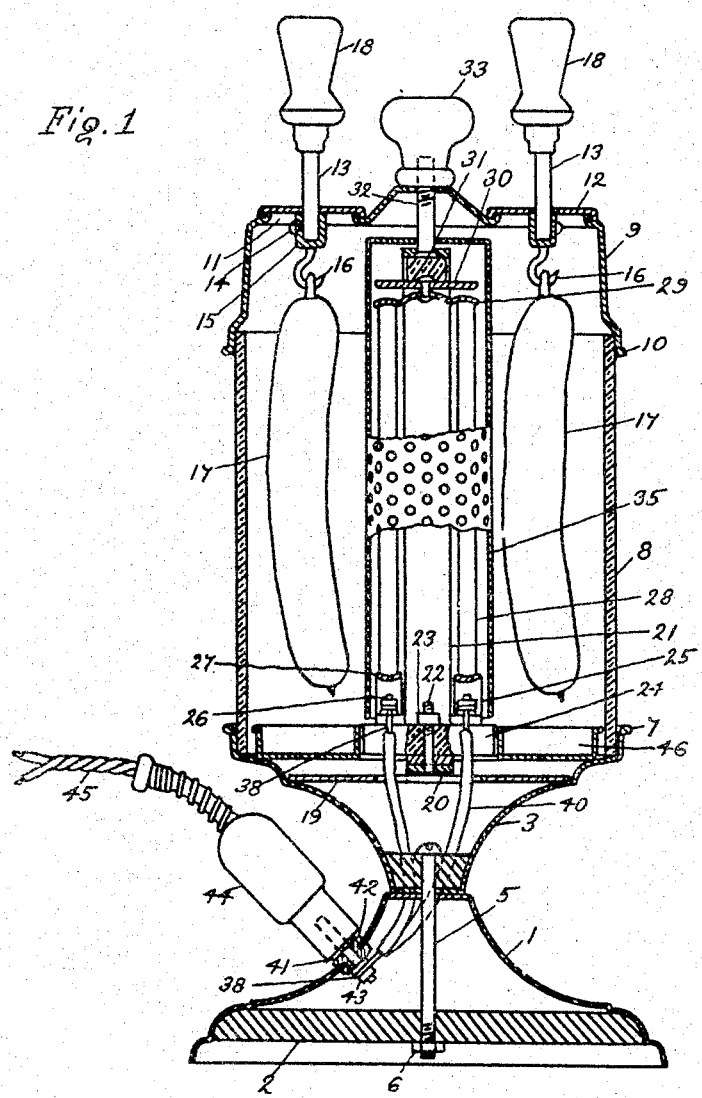
Figure 2:
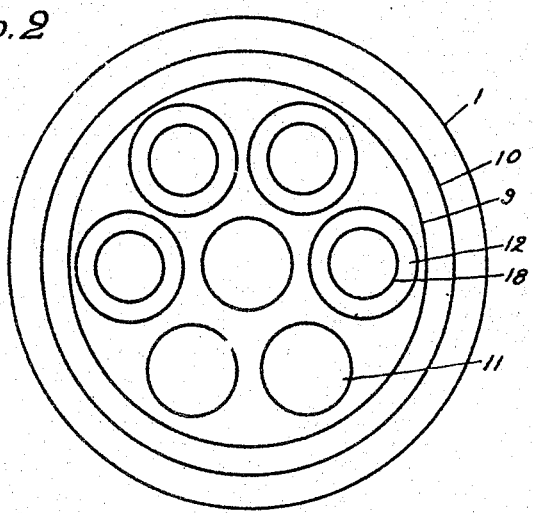
Figure 3:
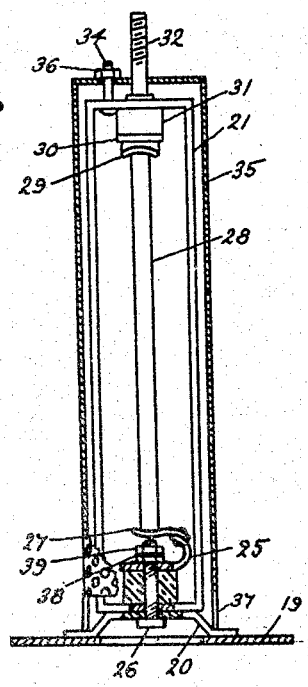
Figure 4:
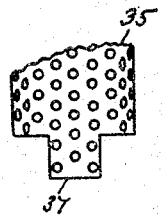

Fig. 1 is a sectional elevation of my device, Fig. 2 is a top plan view, Fig. 3 is a detail view of the heating element, and Fig. 4 is a detail view of a portion of the protecting tube.

My device consists of a base 1 preferably made of a spun or stamped metal with a heavy plate 2 which adds to the stability of the device. This base (or sub-base) supports a holder or upper base 3 also made of a spun or stamped metal and attached to the sub-base with a screw 5 with a nut 6. The upper portion of the holder 3 has a flange 7 retaining the lower edge of a glass tube or cylinder 8. This cylinder can be made of any transparent material, preferably of a heat resisting high silica glass.

A cover 9 is placed on top of the cylinder 8, its lower portion being expanded as shown in Fig. 1 and provided with a flange 10 retaining the edge of the cylinder 8.

The cover 9 has apertures 11 symmetrically arranged around its center and preferably provided with raised edges. Discs 12 or small covers are placed over these apertures and are provided with flanges adapted to engage the raised edges at the apertures. These discs or coverlets have holes in their centers for rods 13 preferably made of some heat insulating material like bakelite, fiber etc. These rods are clamped with screws 14 in tubes 15 attached to the under surface of the coverlets and provided with hooks 16 for frankfurters 17.

The upper ends of the rods 13 have handles also made of a suitable heat insulating material (18).

The upper base 3 supports a plate 19 with a hole in the center. This plate has a bracket 20 supporting a metal frame 21 by a screw 22 with a nut 23 passing also through an insulation block 24 preferably made of a refractory material such as lava, porcelain etc. This block is shown partly in section in Fig. 1.

At the ends of the block 24 metal curved plates 25 are attached with screws 26 passing through the block 24. Plates 27 are riveted to the ends of the plates 25 and are provided with cup shaped depressions for the lower ends of heating rods 28. The plates 27 are preferably made of an alloy resisting oxidation. The rods 28 may be made of any material having a sufficiently high resistance to become heated when electric current is passing through them, but I found that special high resistance carbon provides an excellent material for this purpose.

The upper ends of the rods 28 are bridged with a plate 29 also made of an oxidation resisting alloy, riveted to a flat plate 30 (the plate 29 has cup-shaped depressions to hold the ends of the rods and is made resilient). The latter is wedged under the upper bar of the frame 21 by means of a spacing block 31 made of a refractory insulation material such as lava, porcelain, bakelite etc.

The upper portion of the frame 21 has a screw 32 extending through a corresponding hole in the cover 9 through its central raised portion. A thumb nut 33 is screwed on the end of the screw 32 holding the cover 9 and the cylinder 8 against the upper base 3, the plate 19 with the bracket 20 being attached to the upper base 3. The nut 33 is preferably made of a heat insulating material such as glass, porcelain etc. and it may be of an ornamental shape.

The frame 21 has also a screw 34 at the side passing through a corresponding hole in the upper portion of a perforated tube 35. A nut 36 clamps this tube with its bottom lugs 37 against the bracket 20 on the plate 19. The lower portion of the tube between the lugs is cut away as shown in order to clear the screws 26 with electric wires 38 the ends of which are clamped under the nuts 39 on the screws 26. These wires are covered with an asbestos or similar heat resisting insulation 40 and are attached with their other ends to studs 41 passing through insulation bushings 42 in the wall of the sub-base 1. The studs 41, of which there are two, are clamped with nuts 43 which also hold the wires 38. A plug connector 44 of an ordinary type is removably fitted on the studs 41 and is provided with flexible insulated wires 45 with a plug or socket at the other end (not shown) adapted to be connected with ordinary lighting fixtures.

A circular pan 46 is placed on the upper base 3 to catch drippings from the frankfurters 17 and has a central aperture clearing the block 24.

The operation of my device is as follows.

With the electric current turned on the carbon rods 28 become heated and incandescent, radiating sufficient heat to roast the frankfurters 27. The perforated tube 35 serves to distribute this heat more evenly around and to moderate same so as to prevent the burning of the frankfurters in a few spots.

The frankfurters 17 are hung on hooks 16 and placed in a circular chamber around the tube 35. They can be easily handled, turning them around by the handles 18 and removing when properly roasted.

The whole device can be easily taken apart for cleaning, etc., by unscrewing the thumb nut 33. The carbon rods 28 can be easily replaced if necessary by removing the block 31. The holders 27 and 29 being resilient, the rods are retained under proper tension regardless of their variation in length when heated or cooled.

Important advantages of my device are that it is portable, ornamental, can be easily handled and operated, also that it can be easily taken apart for cleaning and repairs. It is fully enclosed and is sanitary, protecting the frankfurters from the outside air, dust, etc.

I claim as my invention:

1. In a roasting apparatus, the combination with a base, of a transparent tubular member on said base, a cover on said tubular member, a frame supported centrally on said base, said cover being adapted to be attached to said frame thereby retaining said tubular member, said cover being provided with a plurality of apertures, holders for sausages adapted to be supported on said cover over said apertures, said sausages being suspended from said holders inside of said tubular member, a heater supported on said central frame, and a ring-shaped tray on said base under said sausages.

2. In a roasting apparatus, the combination with a base, of a tubular member on said base, a cover on top of said tubular member, a frame supported centrally on said base, a heater supported in said frame, a perforated cylinder enclosing said heater, a threaded stud extending from said frame through said cover, a thumb nut screwed on said stud and holding said cover against said tubular member, said cover being provided with apertures, and means to suspend sausages through said apertures into the space between the inside walls of said tubular member and said perforated cylinder.

3. In a roasting apparatus, the combination with a base, of a tubular member on said base forming a roasting chamber, a cover on said tubular member, a frame centrally supported on said base, said cover being attached to the upper end of said frame, a heating element supported on said frame, a perforated cylinder enclosing said heating element and said frame, said cover being provided with a plurality of apertures, the edges of said cover in said apertures being raised, coverlets in the shape of inverted cups adapted to fit over said raised edges on said apertures, heat insulated handles on said coverlets, and means to suspend sausages from said coverlet into said roasting chamber.

In testimony whereof I affix my signature.
ISAAK F. BLIER.